June 4, 1935.　　J. A. SKOGLUND　　2,003,837

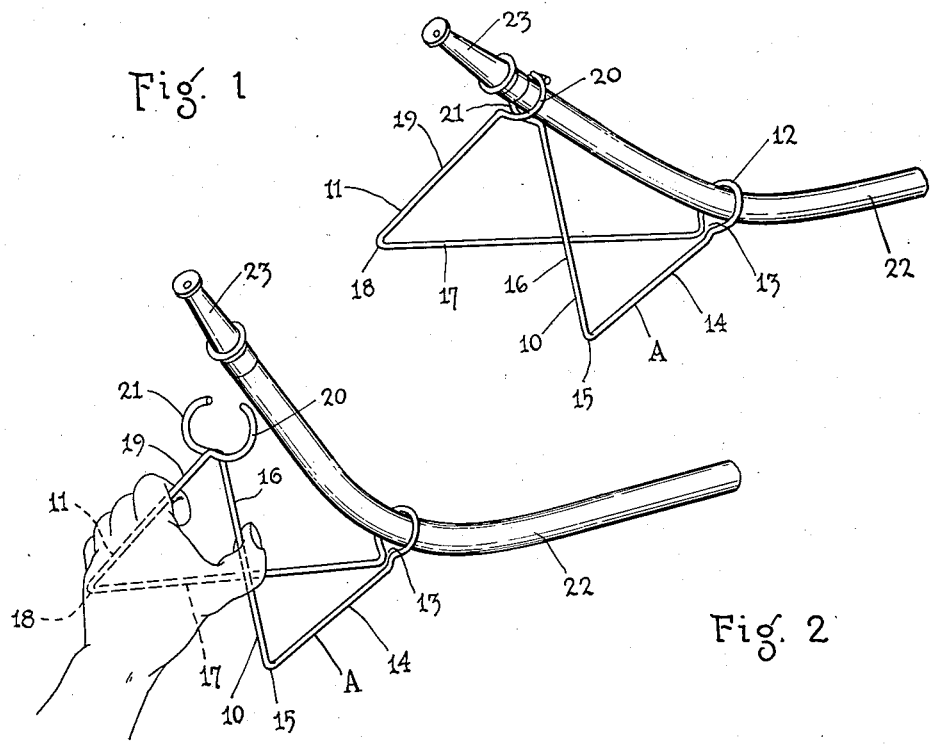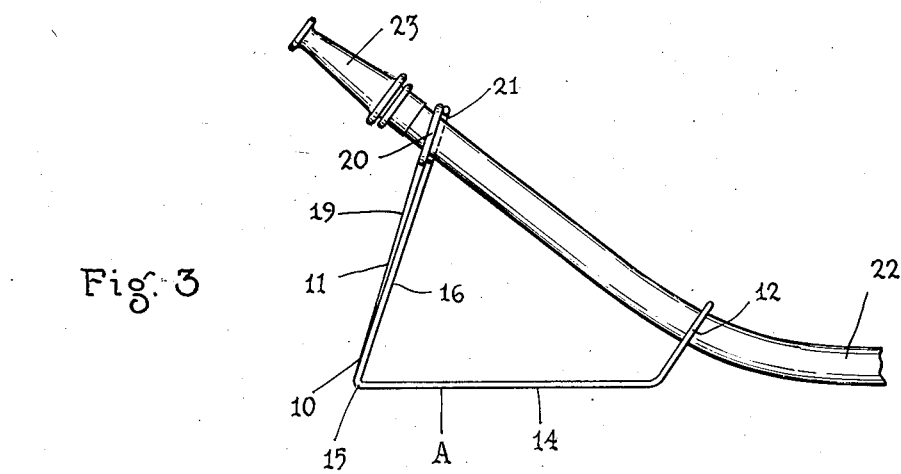

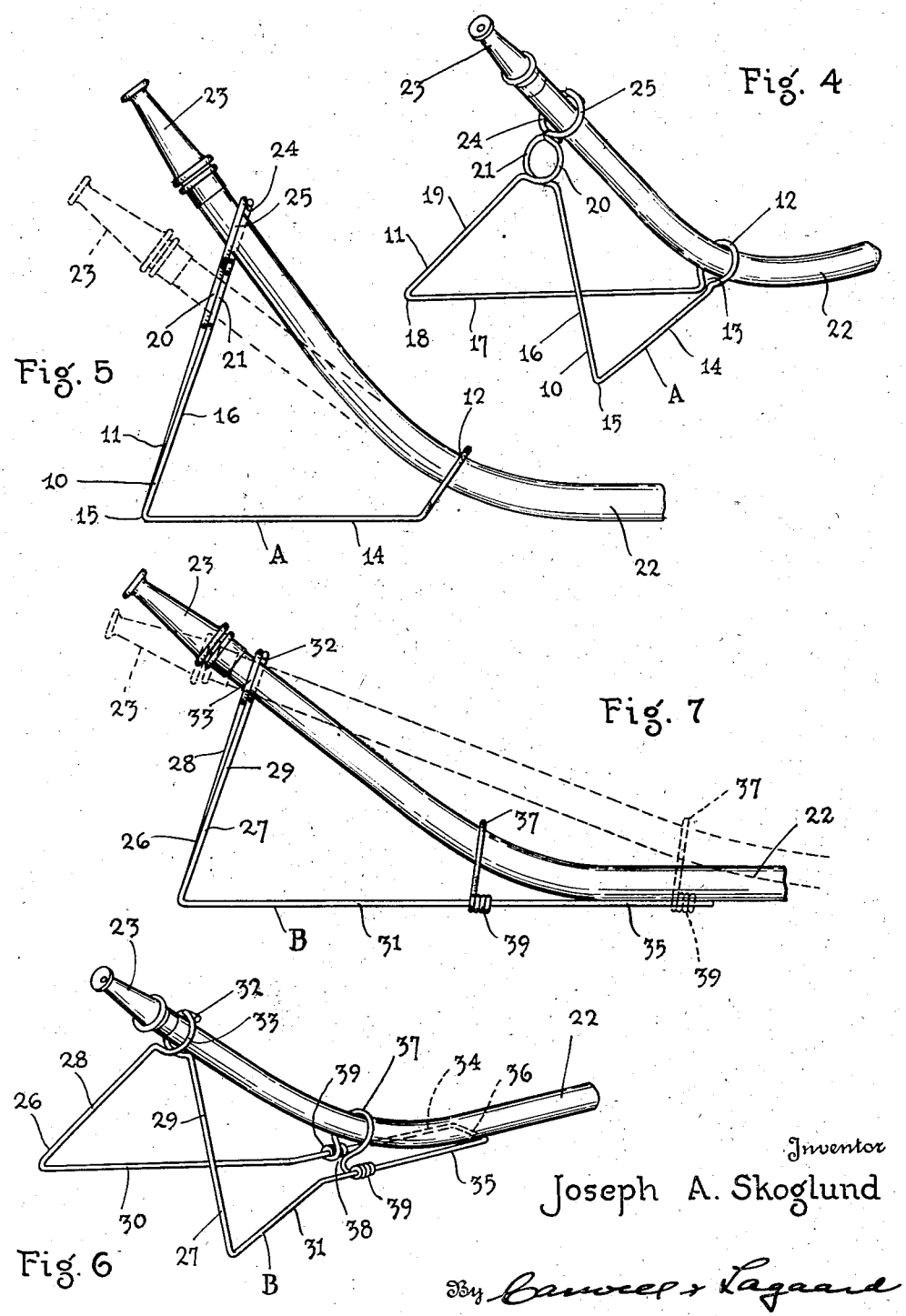

NOZZLE HOLDER

Filed Sept. 24, 1932　　3 Sheets-Sheet 3

Inventor
Joseph A. Skoglund

By Caswell & Lagaard
Attorneys

Patented June 4, 1935

2,003,837

UNITED STATES PATENT OFFICE 2,003,837

NOZZLE HOLDER

Joseph A. Skoglund, St. Paul, Minn.

Application September 24, 1932, Serial No. 634,681

2 Claims. (Cl. 248—83)

My invention relates to nozzle holders, and has for an object thereof to provide a holder of such character by means of which the nozzle of a garden hose may be held in suitable position to water a given area of lawn or garden.

Another object of the invention resides in providing a nozzle holder of simple and durable construction which is light in weight, yet capable of reliably holding a nozzle, as desired.

A further object of the invention resides in providing a nozzle holder to which a nozzle and attached hose may be quickly and easily applied and from which such nozzle and hose may be quickly and easily removed.

An object of the invention resides in constructing the nozzle holder in the form of a stand having two members spaced apart throughout their intermediate portions and connected at certain ends and formed with jaws or rests at their other ends for supporting a nozzle or attached hose adjacent thereto.

Another object of the invention resides in constructing said members with base portions and with upstanding portions or legs.

A further object of the invention resides in providing the free upper ends of the legs with jaws or rests to receive and hold elevated a nozzle or adjacent part of an attached hose, and in providing a keeper at the junction of the base portions to engage the hose and hold it down at a point removed from the nozzle, whereby the nozzle is disposed in inclined position.

A further object of the invention resides in constructing the base portions of the stand structure in such a manner that they diverge from the keeper and in constructing the legs so that they converge and thus bring the jaws thereof into cooperative relation.

An object of the invention resides in constructing the keeper in the form of an eye through which a hose is threaded, and in providing a gap in the eye structure through which a hose may be laterally admitted or withdrawn, if desired.

An additional object of the invention is to provide a stand, which, through the hose, may be pulled along the ground to be repositioned for watering new areas, and in which the eye is inclined upwardly and rearwardly to facilitate the sliding of the stand on the base portions thereof, as on runners.

Another object of the invention is to provide a stand of the character indicated in connection with which the applied hose provides a handle, at or near the nozzle, for carrying the holder from one sprinkling position to another or during temporary hand sprinkling.

A further object of the invention is to provide a stand, as above indicated, which is stable in use and which permits of ready nozzle adjustment without danger of wetting the attendant.

Another object of the invention resides in constructing the nozzle holder of a single length of wire, strap material, or the like, and in forming the same medially thereof to provide the eye, and in further bending the two reaches at either side of the eye to form the base portions and legs, and still further forming the free ends of the legs to provide the nozzle or hose engaging jaws.

An object of the invention resides in constructing the nozzle holder of material sufficiently resilient to provide for yieldingly holding the jaws in gripping engagement with a nozzle or hose.

A feature of the invention resides in the crossed disposition of the legs and in the corresponding relation of the jaws, whereby the user may spring the legs toward each other with one hand and thereby release the grip of the jaws or properly station said jaws to receive a nozzle or hose.

An additional object of the invention is to provide a device of the present character having ring-like jaws between which a hose may be clamped in various angular positions.

Other objects of the invention reside in the novel combination and arrangement of parts and in the details of construction hereinafter illustrated and/or described.

In the drawings:

Fig. 1 is a perspective view of a nozzle holder illustrating an embodiment of my invention.

Fig. 2 is a perspective view similar to Fig. 1, showing the method of applying the holder to a hose.

Fig. 3 is a side elevational view of the structure shown in Fig. 1.

Fig. 4 is a perspective view, similar to Fig. 1 of another form of the invention.

Fig. 5 is a view similar to Fig. 3, further illustrating the form of the invention shown in Fig. 4.

Fig. 6 is a perspective view similar to Fig. 1, illustrating still another form of the invention.

Fig. 7 is a view similar to Fig. 5 further illustrating the form of the invention shown in Fig. 6.

Figure 8:
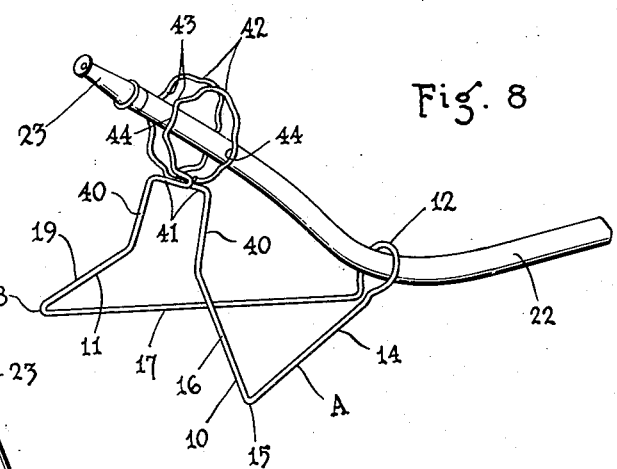
Fig. 8 is a perspective view similar to Fig. 1, of an alternate form of the invention.

In watering lawns and gardens, or the like, it frequently becomes desirable to utilize the ordinary garden hose and nozzles for spraying or otherwise sprinkling. In such case the user is obliged to hold and direct the nozzle himself or resort to some device improvised or otherwise for holding the nozzle. The present invention provides a very simple and inexpensive, but exceedingly effective device for holding a nozzle directionally positioned to water such area as may be desired.

For the purpose of illustrating the application of my invention, I have shown an ordinary garden hose 22 which is provided with an adjustable nozzle 23 of ordinary construction.

My improved holder, shown as constructed of a single length of wire, is indicated in its entirety at A. This device consists of two similar members 10 and 11, formed from opposed sections of the wire and spaced apart along the extent of said sections. In the construction of my improved nozzle holder, the wire is bent intermediate its ends to form an eye 12 at the juncture of the two members 10 and 11. This eye, if desired, may be bent to leave an opening, as at 13, through which the hose may be laterally admitted to the eye or similarly removed therefrom. The member 10 includes a base portion 14 next to the eye 12 and bent upwardly therefrom at 15 is the terminal portion which provides a leg 16. Similarly, the member 11, bent at 18, provides the second base portion 17 and the leg 19.

At the free upper ends of the legs 19 and 16 are jaws 20 and 21 which are formed by bending the material of said legs in opposed semicircular shape. These jaws cooperating one with the other provide a rest or support in which the hose 22 (Fig. 1) or nozzle is received and gripped. A wire having some resiliency is employed so that the two members 10 and 11 normally tend to spring apart. In setting the jaws 20 and 21 to receive a hose the legs 16, 19 are forced together in crossed relation, as shown in Fig. 1, flexing stresses being thereby set up in said legs and in the base portions 14, 17 and in the eye 12 at the juncture of said base portions. With the stresses thus distributed through said members of the stand and the various bends between them, no localized breaking or bending force is experienced, nor are the strains of repeated operations applied so as to impair the resiliency of the structure at any particular locality therein. By means of the construction described, the natural spring of the wire, throughout the major extent thereof, urges the jaws closed and thereby holds a hose securely gripped therebetween. When it is desired to disengage the hose from the jaws, the two legs 16 and 19 are grasped and brought together, as illustrated in Fig. 2. This moves the jaws 20 and 21 apart, permitting of removal of the hose therefrom. The jaw structure at the upper ends of the legs 16 and 19 and the eye 12 at the juncture of the base portions 14 and 17 engage the hose at different elevations and hold it upwardly inclined to properly direct the nozzle 23.

A user grasps the holder in one hand and springs the legs 16, 19 into crossed relation, as shown in Fig. 2. With the other hand, he threads the hose endwise into the eye 12 or passes it laterally into said eye through the opening 13, said opening, when designed to admit the hose, being preferably somewhat smaller than the hose diameter so that after the hose is compressed to enter the eye 12, it will remain threaded therein without danger of accidental dislodgment therefrom. After the hose is threaded into the eye 12, the free end of the hose is passed between the open jaws 20, 21. The legs are then released and the jaws come together against opposite sides of the hose. In the drawings, I have shown the jaws 20, 21 as applied to the hose proper immediately adjacent to nozzle 23. If it be desired to lessen the inclination of the hose, the same may be accomplished by increasing the distance between the nozzle and the point of application of the jaws to the hose. The protruding end of the hose then sags under its own weight and the weight of the nozzle with the result that the nozzle becomes less sharply inclined. It is to be noted that the jaws 20 and 21 may be applied directly to the nozzle instead of to the hose. And it will be understood that the various references herein to the gripping of the hose by the jaws are intended to embrace the gripping of the nozzle by said jaws.

A substantial spread between the diverging base portions 14, 17 provides a firm footing for the stand and, further tending to prevent the overturning of the stand, the legs are inclined rearwardly to bring the center of gravity of the supported load more nearly centrally of the footing provided in said base portions. Further promoting the stability of the stand is the disposition of the jaws 20, 21 and the eye 12 in a vertical plane extending centrally, longitudinally of the device. The eye 12, rearwardly inclined, as shown, serves somewhat like the turned up portion of a sled runner, when the stand is slid along the ground by pulling on the hose 22.

If desired, a second set of jaws 24 and 25 may be added to the legs 16 and 19 of the stand as illustrated in Figs. 4 and 5. When the device is so constructed the hose may be placed between either of the two pairs of jaws and thereby held at different angles. Any variation from the normal positions of the hose, as established by the two sets of jaws may, of course, be procured, as previously described, by projecting the hose more or less in front of the stand.

In Fig. 6, I have shown another form of the invention in which the hose may be supported at various angles within certain limits. In this form of invention a stand is employed which is indicated in its entirety at B. This stand, similar to the stand A, is constructed of wire and is formed with two members 26 and 27, having legs 28 and 29, and base portions 30 and 31 similar to the corresponding parts of the stand A. The legs 28 and 29 terminate in jaws 32 and 33 which function in the same manner as the jaws 20 and 21. The base portions 30 and 31 of this stand instead of being joined through an eye, are formed with two rearwardly extending reaches 34 and 35 which lie parallel to one another and are joined through a connecting portion 36. In this form of the invention a separate eye 37 is provided, which is formed with an opening 38 similar to the opening 13 of eye 12. The loop which forms said eye 37 is provided at its ends with a number of closely disposed convolutions, indicated at 39, which form bearings encircling the two reaches 34 and 35. These bearings are slidable upon said reaches and permit of the backward and forward movement of the eye 37 thereon.

The form of the invention shown in Fig. 6 is used substantially the same as that shown in Figs. 1 and 2. The hose is applied to the eye 37 and to the jaws 32 and 33 of the stand in the manner previously described. If, after the hose has been applied to the stand, a change in the inclination of the hose is desired, the user merely slides the loop 37 along the reaches 34 and 35, the movement thereof forwardly increasing the inclination of the nozzle and the movement thereof rearwardly decreasing the inclination thereof. Two of the positions of the nozzle procured through adjustment of the loop 37 have been shown in Fig. 7, one in full lines and one in dotted lines, the corresponding positions of the hose being likewise indicated in said Fig. 7.

Figure 9:
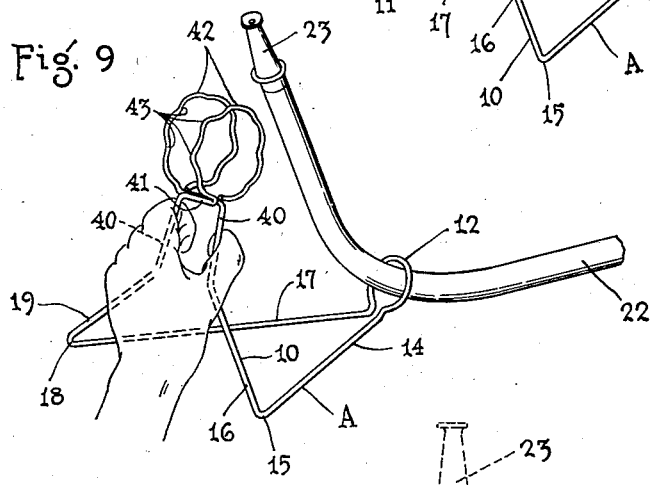
Fig. 9 is a perspective view, similar to Fig. 2, of the structure shown in Fig. 8.
Figure 10:
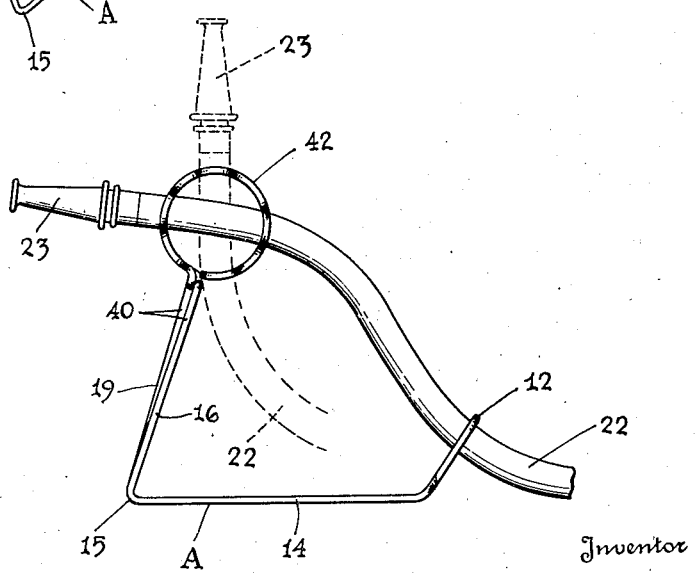
Fig. 10 is an elevational view, similar to Fig. 3, of the structure shown in Figs. 8 and 9.

The form of my invention shown in Figs. 8, 9 and 10 is similar to that shown in Figs. 1, 2 and 3, except for the leg and jaw construction. Instead of forming the legs 16, 19 so that they converge throughout their entire length, the upper portions 40 of said legs are bent into parallelism to provide an easily grasped handhold, as best shown in Fig. 9. Opposed extensions 41 issue horizontally from the upper portions 40 of the legs 16, 19 in the plane of said legs, and, issuing from said extensions 41, are loops or ring-like jaw portions 42, the same lying in vertical parallel planes extending longitudinally of the stand. These ring-like jaws 42 are crimped, as shown, and provide spaced kinks 43 in faced relation about the circumference of the jaws. In each jaw, these kinks are preferably arranged in diametrically opposed relation. Thus constructed, the ring-like jaws 42 present a series of annularly disposed hose receiving portions 44, such portions, in diametrically opposed relation, providing a convenient double grip for a hose. There being a number of such double grips available, a hose may be securely grasped and held in any one of a number of angular positions, whereby the spray from the nozzle 23 may be directed horizontally or vertically or at any intermediate angle as may be desired. The opposed horizontal portions 41 issuing from the upper portions 40 of the legs 16, 19 may serve as a support for the hose 22, the jaws 42, in such case, serving to grip the hose forwardly and also rearwardly of such support. In thus holding the hose in the stand it is immaterial whether or not the hose is gripped between facing kinks 43 or is lodged in the hose receiving portions 44 of the jaws between said kinks. The jaws 42 are large enough in diameter so that the fingers of a user's hand may be inserted through the rings at one side of the hose. Thus constructed the jaws 42 constitute a handle by means of which the stand and applied hose may be picked up and moved. In this connection it is to be noted that when the said jaws 42 are used as a handle and are squeezed together by the user's fingers, the hose 22 is more firmly gripped between the jaws and better rendered secure against dislodgment from adjusted position therein when force is exerted through the stand to pull the hose along the ground.

My invention is highly advantageous in that an extremely simple and effective device is provided by means of which the ordinary nozzle employed with a garden hose may be held in a position to water any particular part of a lawn or other area. The device can be constructed at extremely small cost. It is easy to apply to the hose, and when once applied securely supports the hose in desired position. The inclination of the hose may be varied so that the stream of water discharged therefrom may be directed over a selected area and in the manner desired. The device may be drawn about upon the ground by pulling on the hose so that it does not become necessary to shut off the water when the location of the nozzle is to be changed. And without turning off the water, the nozzle may be adjusted. Being light in weight and not at all cumbersome, the holder, attached to the hose, may be picked up and carried therewith in changing the position of the hose or in the manipulation thereof in hand sprinkling.

Changes in the specific form of my invention, as herein disclosed, may be made within the scope of what is claimed without departing from the spirit of my invention.

Having described my invention, what I claim as new and desire to protect by Letters Patent is:

1. A nozzle holder comprising a stand constructed solely of a single length of wire bent intermediately thereof to form an upstanding eye open at the bottom thereof for the lateral insertion of a hose thereinto, said wire being further bent to provide base portions diverging forwardly from said eye and legs converging upwardly from said base portions, said wire being still further bent to provide opposed jaws at the free extremities of the legs, the legs being adapted to be crossed at their upper ends to flex the wire throughout said legs, base portions and eye and thereby position the jaws for receiving and yieldingly gripping said hose at another portion thereof, the flexing of said wire operating to diminish the width of the opening at the bottom of the eye.

2. A nozzle holder comprising a stand constructed solely of a single length of wire bent intermediately thereof to form an upstanding eye for the reception thereinto of a portion of a hose, said wire being further bent to provide base portions diverging forwardly from said eye and legs converging upwardly from said base portions, said wire being still further bent to provide opposed jaws at the free extremities of the legs, the legs being adapted to be crossed at their upper ends to flex the wire throughout said legs, base portions and eye for receiving and yieldingly gripping said hose at another portion thereof, the flexing of said eye including the springing of opposite portions thereof out of the plane normally occupied thereby.

JOSEPH A. SKOGLUND.